United States Patent
Vangala et al.

(10) Patent No.: US 12,418,894 B2
(45) Date of Patent: Sep. 16, 2025

(54) CONFIGURED GRANT ADJUSTMENTS

(71) Applicant: Apple Inc., Cupertino, CA (US)

(72) Inventors: Sarma V. Vangala, Campbell, CA (US); Arjun Bharadwaj, Sunnyvale, CA (US); Fangli Xu, Beijing (CN); Haijing Hu, Los Gatos, CA (US); Lakshmi Iyer, Cupertino, CA (US); Ralf Rossbach, Munich (DE); Sabine Roessel, Munich (DE); Sree Ram Kodali, San Jose, CA (US); Yu-Ting Yu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/904,623

(22) PCT Filed: Sep. 2, 2021

(86) PCT No.: PCT/CN2021/116295
§ 371 (c)(1),
(2) Date: Aug. 19, 2022

(87) PCT Pub. No.: WO2023/028961
PCT Pub. Date: Mar. 9, 2023

(65) Prior Publication Data
US 2024/0196377 A1 Jun. 13, 2024

(51) Int. Cl.
*H04W 72/044* (2023.01)
*H04W 28/02* (2009.01)
(Continued)

(52) U.S. Cl.
CPC ..... *H04W 72/044* (2013.01); *H04W 28/0268* (2013.01); *H04W 72/231* (2023.01); *H04W 72/543* (2023.01); *H04W 76/10* (2018.02)

(58) Field of Classification Search
CPC .......... H04W 28/0268; H04W 72/044; H04W 72/231; H04W 72/543; H04W 76/10
See application file for complete search history.

(56) References Cited

U.S. PATENT DOCUMENTS

| | | | |
|---|---|---|---|
| 2020/0252914 A1 | 8/2020 | Yang et al. | |
| 2021/0058819 A1* | 2/2021 | Ozturk | H04W 28/0263 |

(Continued)

FOREIGN PATENT DOCUMENTS

| | | |
|---|---|---|
| CN | 111356172 | 6/2020 |
| WO | 2020/221171 | 11/2020 |
| WO | 2021/064287 | 4/2021 |

OTHER PUBLICATIONS

LG Electronics Inc. et al., "Mapping between uplink grant and logical channel", 3GPP TSG-RAN WG2, Meeting #107, R2-1911202, Aug. 30, 2019, 2 sheets.

*Primary Examiner* — Donald L Mills
(74) *Attorney, Agent, or Firm* — Fay Kaplun & Marcin, LLP (57) ABSTRACT

A user equipment (UE) configured to establish a packet data unit (PDU) session with a network, wherein the PDU session comprises a quality of service (QOS) flow, receive one or more radio resource control (RRC) messages indicating a configured grant (CG) allocated to the UE, wherein the QoS flow is mapped to a logical channel (LCH) and wherein the LCH is mapped to the CG and transmit data on a physical uplink shared channel (PUSCH) using a time and a frequency resource of the CG.

20 Claims, 8 Drawing Sheets

(51) Int. Cl.
*H04W 72/231* (2023.01)
*H04W 72/543* (2023.01)
*H04W 76/10* (2018.01)

(56) References Cited

U.S. PATENT DOCUMENTS

| | | | |
|---|---|---|---|
| 2021/0258980 A1 | 8/2021 | Luo et al. | |
| 2021/0314977 A1 | 10/2021 | Xu et al. | |
| 2022/0015070 A1* | 1/2022 | Chen | H04W 72/0453 |
| 2022/0330261 A1* | 10/2022 | Yeo | H04L 5/0053 |
| 2022/0377596 A1* | 11/2022 | Kuo | H04L 69/324 |
| 2022/0386165 A1* | 12/2022 | Liu | H04W 76/14 |
| 2023/0362946 A1* | 11/2023 | Adjakple | H04W 72/54 |
| 2024/0155420 A1* | 5/2024 | Zhang | H04W 28/0268 |
| 2024/0251415 A1* | 7/2024 | Isberg | H04W 72/21 |

\* cited by examiner

| Index | NR Recommended Bit Rate Value (Kb/s) |
|---|---|
| 57 | 16000 |
| 58 | 32000 |
| 59 | 128000 |
| 60 | 256000 |
| 61 | 512000 |
| 62 | 10240000 |
| 63 | 20480000 |

Table 700

Fig. 7

CONFIGURED GRANT ADJUSTMENTS

TECHNICAL FIELD

This application relates generally to wireless communication, and in particular relates to Configured Grant Adjustments.

BACKGROUND

A network may allocate resources in a variety of different ways including, but not limited to, configured grant (CG) based allocation and dynamic grant (DG) based allocation. Under conventional circumstances, a user equipment (UE) may request a DG even when the UE is already allocated CG resources. For example, the UE may be configured to transmit data generated by a particular application running on the UE over the physical uplink shared channel (PUSCH) using resources allocated to the UE via a set of CGs. If a CG is insufficient for the data generated by the application, the UE may transmit a request to the network for a DG. However, a scenario may occur in which the UE receives the DG, but the DG does not fit in the processing timeline of the application's quality of service (QoS) requirements. If the DG does not arrive in time, the DG is not utilized and is therefore an inefficient use of UE and network resources.

SUMMARY

Some exemplary embodiments are related to a processor of a user equipment (UE) configured to perform operations. The operations include establishing a packet data unit (PDU) session with a network, wherein the PDU session comprises a quality of service (QOS) flow, receiving one or more radio resource control (RRC) messages indicating a configured grant (CG) allocated to the UE, wherein the QoS flow is mapped to a logical channel (LCH) and wherein the LCH is mapped to the CG and transmitting data on a physical uplink shared channel (PUSCH) using a time and a frequency resource of the CG.

Other exemplary embodiments are related to a processor of a base station configured to perform operations. The operations include establishing a connection with a user equipment (UE), wherein the UE is configured with a packet data unit (PDU) session comprising a quality of service (QoS) flow, transmitting one or more radio resource control (RRC) messages indicating a configured grant (CG) allocated to the UE, wherein the QoS flow is mapped to a logical channel (LCH) and wherein the LCH is mapped to the CG and receiving data on a physical uplink shared channel (PUSCH) from the UE that was transmitted using a time and a frequency resource of the CG.

DETAILED DESCRIPTION

The exemplary embodiments may be further understood with reference to the following description and the related appended drawings, wherein like elements are provided with the same reference numerals. The exemplary embodiments introduce techniques for adjusting the timing of configured grants (CGs).

The exemplary embodiments are described with regard to a user equipment (UE). However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to quality of service (QoS). Those skilled in the art will understand that QoS refers to a quantitative measurement of the overall performance of a service experienced by users of the network. In fifth generation (5G) new radio (NR), QOS is enforced at the QoS flow level. Each QoS flow may be identified by a QoS flow identifier (QFI) and correspond to a packet data unit (PDU) session. For example, network services such as, but not limited to, extended reality (XR) may utilize multiple QoS flows in the uplink and/or downlink. However, reference to the term QoS flow is merely provided for illustrative purposes. Different entities may refer to similar concepts using different terms (e.g., flow, data flow, etc.).

In addition, the exemplary embodiments are also described with regard to a logical channel (LCH). Those skilled in the art will understand that a LCH is defined by the type of information it is configured to carry and may be further characterized as a control channel or a traffic channel. However, the exemplary embodiments are not limited to any particular type of LCH and may apply to any appropriate type of LCH.

The exemplary embodiments are also described with regard to CG based allocation. Those skilled in the art will understand that CGs generally refer to a set of resources that are allocated to the UE by a network for physical uplink shared channel (PUSCH) transmissions. CGs may be further characterized by type, e.g., type 1, type 2, etc. A type 1 CG may refer to a set of time and frequency resources that are configured and activated using radio resource control (RRC) signaling. A type 2 CG may refer to a set of time and frequency resources that are configured by RRC but activated using physical downlink control channel (PDCCH) signaling. However, any reference to a particular type of CG is merely provided for illustrative purposes. The exemplary embodiments may apply to any type of CG or similar type of resource allocation mechanism.

An application running on the UE may generate data for one or more QoS flows. Multiple QoS flows may map to a different LCH or to a same LCH. In third generation partnership program (3GPP) release 16 (Rel-16), multiple CGs and/or LCHs can be configured and activated simultaneously. The LCH to CG mapping may be implemented as a 1:N mapping or an N:1 mapping, e.g., multiple LCHs mapped to a single CG or vice versa. During operation, if a collision between a dynamic grant and a CG occurs, the UE selects one of the dynamic grant or CG for the uplink transmission based on the corresponding LCH priority.

As indicated above, data generated by an application running on the UE may be mapped to one or more QoS flows, each QoS flow may be mapped to one or more LCHs and each LCH may be mapped to one or more CGs. Throughout this description, to differentiate between QoS flows, each QoS flow may be numbered (e.g., QoS flow 1, QoS flow 2, etc.). Similarly, each LCH and CG may also be numbered (e.g., LCH 1, LCH 2, CG 1, CG 2, etc.). The numbering of these components is not intended to indicate any preference with regard to components of the same type nor is the numbering intended to indicate a relationship between components of a different type. For instance, QoS flow 1 is not required to be prioritized over QoS flow 2 nor is QoS flow 1 required to be mapped to LCH 1 and/or CG 1. Instead, any reference to a numbered QoS flow is only intended to differentiate QoS flows, any reference to a numbered LCH is only intended to differentiate LCHs and any reference to a numbered CG is only intended to differentiate CGs.

The network may also utilize dynamic grant (DG) based allocation. For example, a base station may allocate resources to the UE for a PUSCH transmission in response to a buffer status report (BSR) (e.g., scheduling request). The DG may be indicated to the UE via downlink control information (DCI) or in any other appropriate manner.

Under conventional circumstances, the UE may request a DG even if the UE has already been allocated CG resources. For example, the UE may be configured to transmit data generated by an application running on the UE over the physical uplink shared channel (PUSCH) using resources allocated to the UE via a set of CGs. If a CG is insufficient to handle the data generated by the application, the UE may transmit a BSR to the network for DG resources. However, a scenario may occur in which the UE receives the DG but the DG does not fit in the processing timeline of the application's QoS requirements. When the DG does not arrive in time, the DG is not utilized. As a result, the resources on the UE side and the network side that were used to request, configure and transmit the DG are wasted because the DG resources are not actually utilized by the UE.

As will be described in more detail below, the exemplary embodiments introduce techniques for adjusting the timing of CGs. These exemplary techniques may allow the UE and the network to avoid the inefficient use of DGs like in the scenario described above. However, the exemplary techniques are not required to be utilized to replace the use of DGs and may provide benefits to any CG based allocation mechanism. The exemplary embodiments may be utilized in conjunction with currently implemented CG mechanisms, future implementations of CG mechanisms or independently from other CG mechanisms. Specific examples of each of the exemplary techniques will be provided in detail below.

Figure 1:
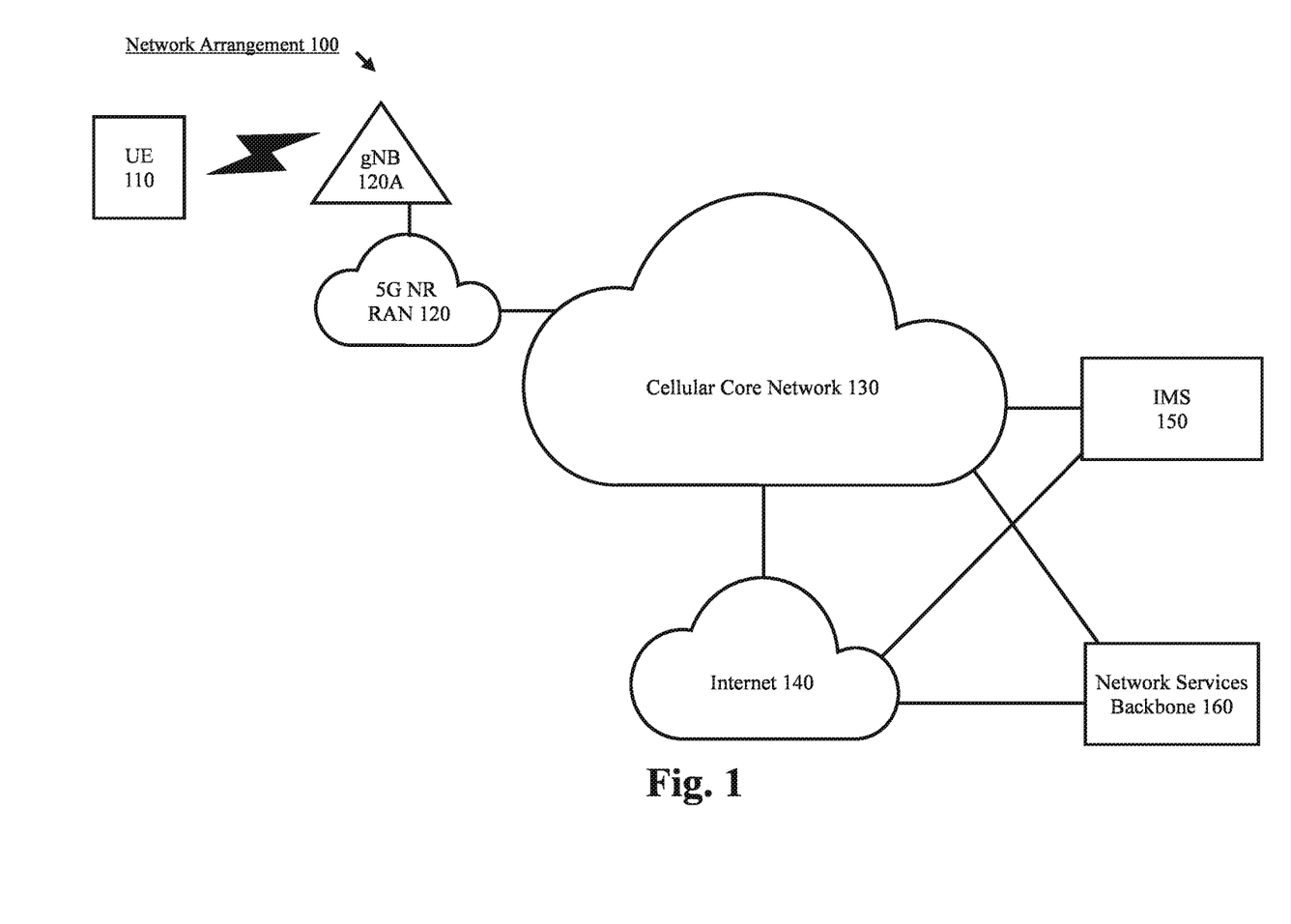
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR-RAN 120. Therefore, the UE 110 may have a 5G NR chipset to communicate with the 5G NR-RAN 120.

The 5G NR-RAN 120 may be a portion of a cellular network that may be deployed by a network carrier (e.g., Verizon, AT&T, T-Mobile, etc.). The 5G NR-RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
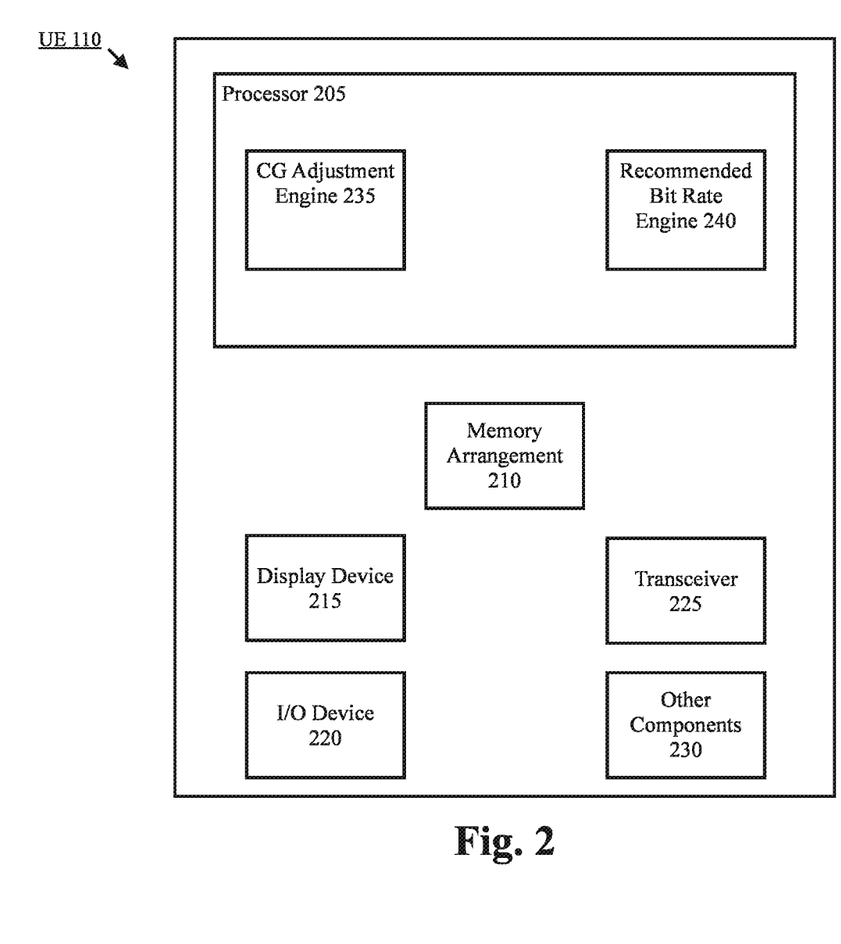
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a CG adjustment engine 235 and a recommended bit rate engine 240. The CG adjustment engine 235 may perform various operations related to adjusting the timing of CGs such as, but not limited to, identifying that data generated for a QoS flow and the timing of the corresponding CGs are not properly aligned, providing information to the network that indicates how CGs are to be adjusted and adjusting the CG configuration. The recommended bit rate engine 240 may perform various operations related to applying a recommended bit rate to a QoS flow.

The above referenced engines 235 and 240 being an application (e.g., a program) executed by the processor 205 is merely provided for illustrative purposes. The functionality associated with the engines 235 and 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
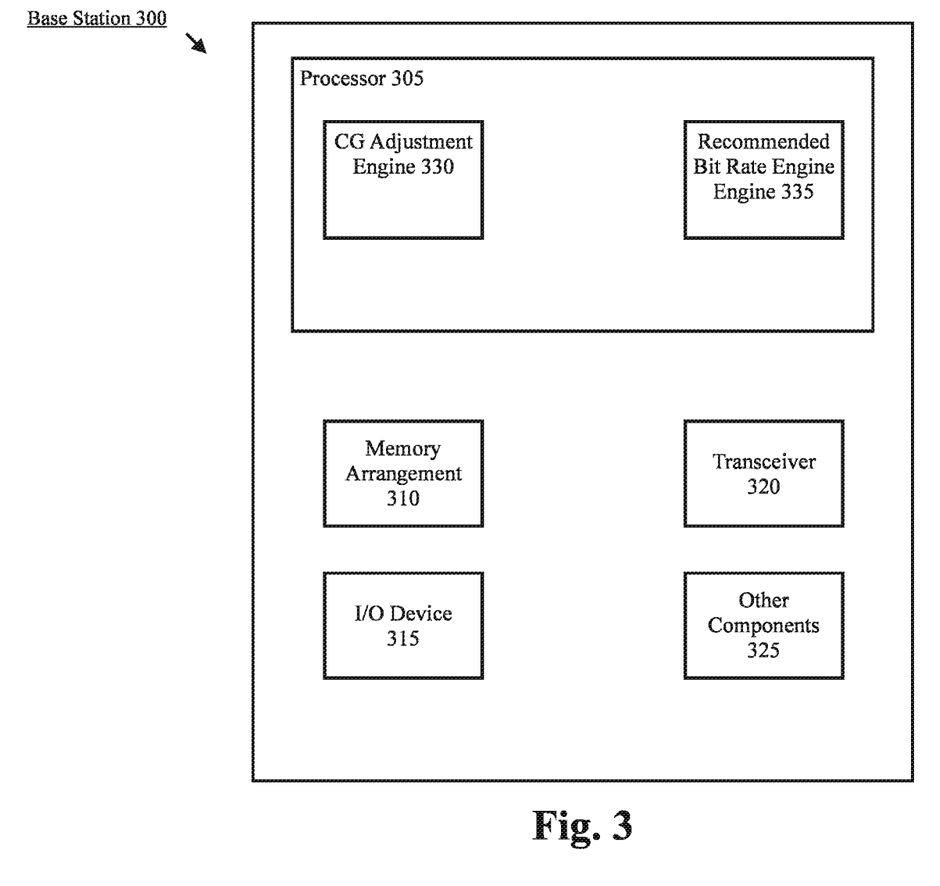
FIG. 3 shows an exemplary base station according to various exemplary embodiments.

FIG. 3 shows an exemplary base station 300 according to various exemplary embodiments. The base station 300 may represent the gNB 120A or any other type of access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 105. For example, the engines may include an CG adjustment engine 330 and a recommended bit rate engine 335. The CG adjustment engine 330 may perform various operations related to adjusting the timing of CGs such as, but not limited to, receiving information from the UE 110 indicating that the timing of the CGs should be adjusted to better align with the timing of the QoS processing requirements and adjusting the CG configuration for the UE 110. The recommended bit rate engine 335 sends a recommended bit rate for a QoS flow to the UE 110.

The above noted engines 330 and 335 being an application (e.g., a program) executed by the processor 305 is only exemplary. The functionality associated with the engines 330 and 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory arrangement 310 may be a hardware component configured to store data related to operations performed by the base station 300. The I/O device 315 may be a hardware component or ports that enable a user to interact with the base station 105. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
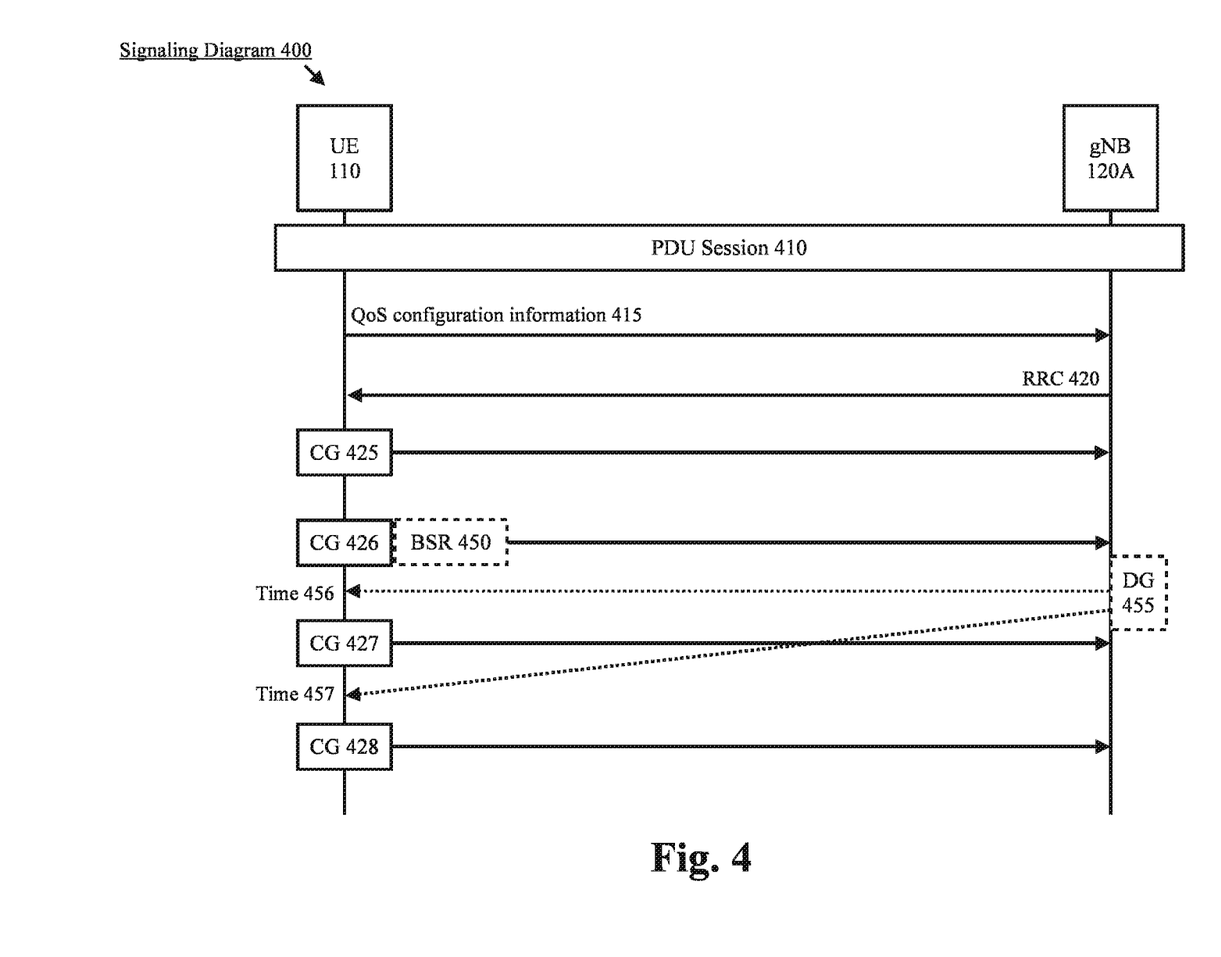
FIG. 4 shows a signaling diagram illustrating configured grant (CG) based allocation according to various exemplary embodiments.

FIG. 4 shows a signaling diagram 400 illustrating CG based allocation according to various exemplary embodiments. The signaling diagram 400 includes the UE 110 and the gNB 120A of the network arrangement 100. The signaling diagram 400 is provided as a general example of CG based allocation. However, the manner in which a CG is configured at the UE 110 is beyond the scope of the exemplary embodiments. Instead, the exemplary embodiments relate to adjusting the timing of CGs. The exemplary techniques described herein for adjusting CGs may apply to CGs that have been configured in any appropriate manner.

In 410, a PDU session 410 is established between the UE 110 and a 5G NR network. In 415, the UE 110 transmits QoS configuration information to the gNB 120A. For example, the QoS configuration information may include a 5G QOS identifier (5QI), a QoS flow identifier (QFI), a logical channel ID (LCID), etc.

In 420, the gNB 120A transmits one or more RRC messages to configure the UE 110 with CGs for a particular QoS flow. For example, the gNB 120A may utilize the QoS configuration information received in 415 to establish a CG profile by translating the 5QI information into logical channel groups (LCGs). The RRC messages may establish a dedicated radio bearer (DRB) for the QoS flow with properties such as, but not limited to, one or more LCGs, packet data convergence protocol (PDCP) duplication, a modulation and coding scheme (MCS) table, channel state reporting with block error rate (BLER).

The network allocates CGs 425-428 to the UE 110 for the QoS flow. Thus, the UE 110 is configured to perform PUSCH transmissions using the time and frequency resources represented by CGs 425-428. Reference to four CGs is merely provided for illustrative purposes. In an actual QoS flow configuration, the duration of the QoS flow may vary and any appropriate number of CGs may be configured.

There may be scenarios in which a CG is not sufficient for the amount and/or type of data that is to be transmitted in accordance with the applicable QoS requirements. Under conventional circumstances, the UE 110 transmits a BSR to request a DG to fulfill the data requirements. Alternatively, the network may proactively provide DGs to the UE 110 when the network determines that the UE 110 is likely to need additional uplink resources to fulfill its data requirements. Regardless of the approach, it has been identified that in an actual operating scenario DGs are wasted because they are not provided at the appropriate time.

To provide an example within the context of the signaling diagram 400, the UE 110 may transmit the BSR 450 to the gNB 120A. If the DG 455 is allocated at time 456, the UE 110 may utilize the DG for a PUSCH transmission. However, if the DG 455 is allocated at time 457, the UE 110 may be unable to use the DG 455 because it does not fit within the processing timeline of the QoS requirements. Thus, in this type of scenario, the processing and power resources used by the UE 110 to transmit the BSR 450 and receive the DG 455 are wasted because the DG 455 is not actually used for a PUSCH transmission. Even if the DG 455 is allocated at an appropriate time (e.g., time 456), the request/grant mechanism introduces latency and places additional burden on the processing capabilities of the gNB 120A and the 5G NR network especially in multi-UE scenarios. As will be described in detail below, the exemplary embodiments introduce techniques for adjusting the timing of CGs to adapt to the data generation of the QoS flow.

Figure 5:
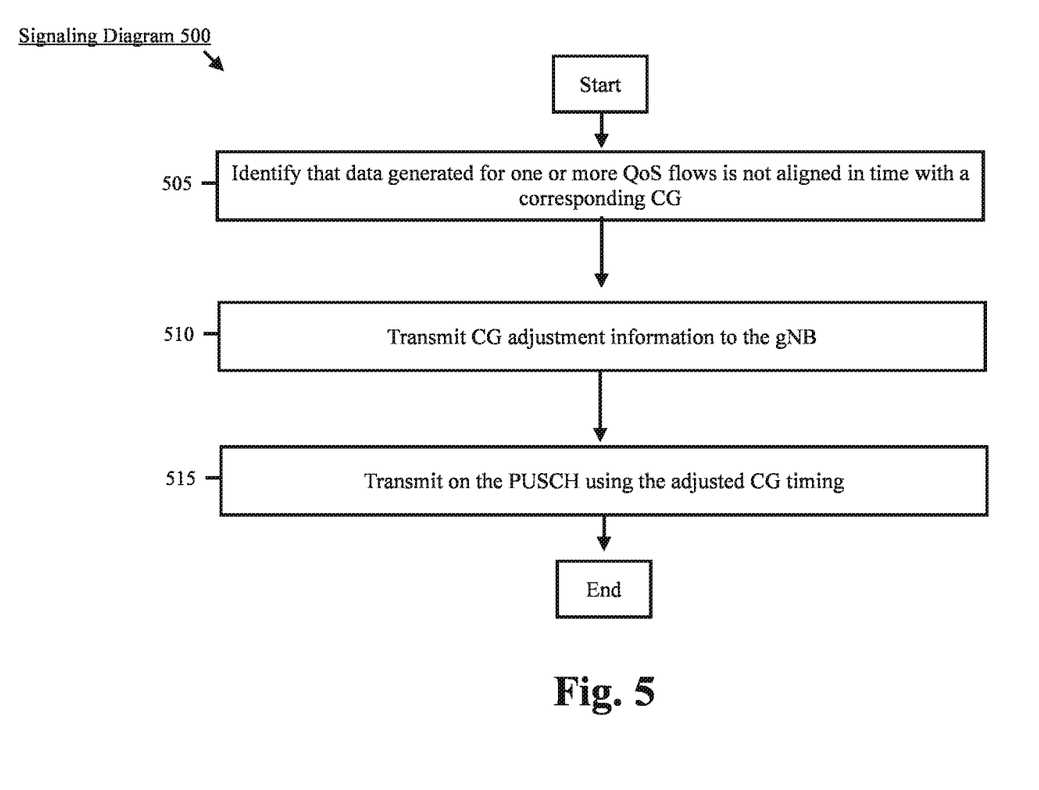
FIG. 5 shows a method for adjusting a CG according to various exemplary embodiments.

FIG. 5 shows a method 500 for adjusting a CG according to various exemplary embodiments. The method 500 is described from the perspective of the UE 110.

Figure 6A:
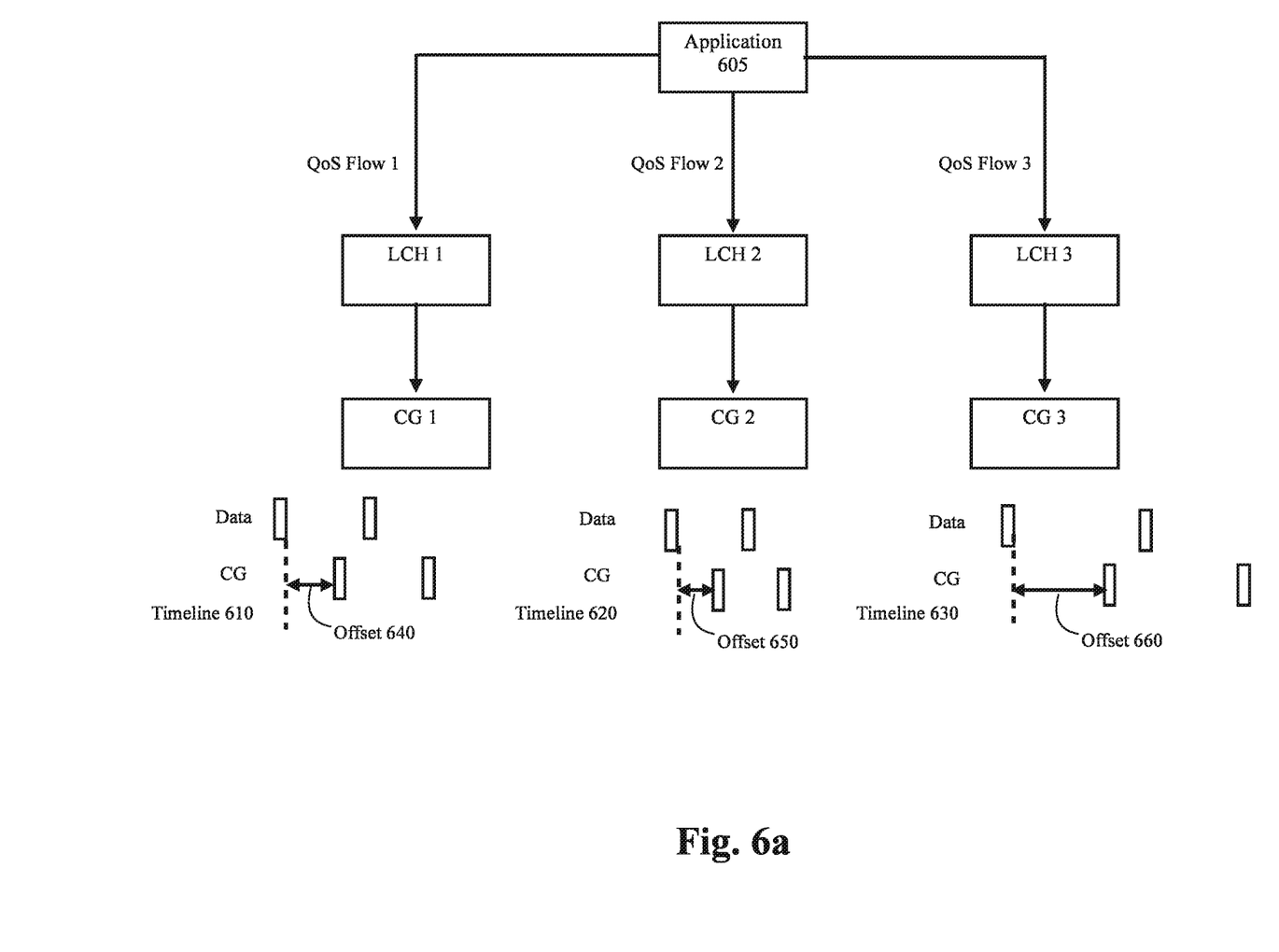
FIG. 6a shows one example mapping where multiple quality of service (QoS) flows are each mapped to a different logical channel (LCH) according to various exemplary embodiments.
Figure 6B:
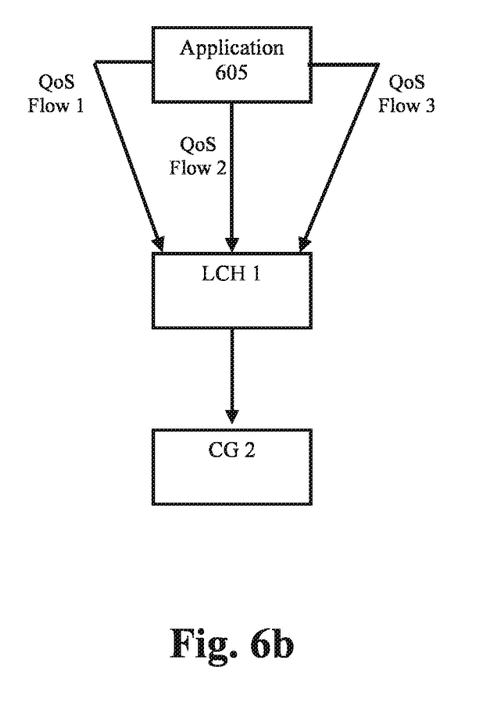
FIG. 6b shows one example mapping where multiple QoS flows are each mapped to a same LCH according to various exemplary embodiments.

The method 500 relates to a mapping between one or more QoS flows, one or more LCHs and one or more CGs. Prior to discussing the exemplary techniques, an example of different mappings are shown in FIGS. 6a-6b. However, the exemplary embodiments are not limited to any particular QoS flow to LCH mapping or any particular LCH to CG mapping. The exemplary embodiments may apply to any appropriate mapping between QoS flows, LCHs and CGs.

FIG. 6a shows an example mapping where multiple QoS flows are each mapped to a different LCH. Here, an application 605 running on the UE 110 is configured with three QoS flows 1-3 each mapped to a different LCH 1-3. Each LCH 1-3 may be mapped to a different CG 1-3. In other configurations where multiple QoS flows are mapped to multiple LCHs, each LCH may be mapped to the same CG, e.g., LCH 1-3 may all be mapped to the same CG.

In this example, the data generated for each QoS flow 1-3 does not align in time with their respective CGs 1-3. The misaligned timing of CG 1 and data generated for QoS flow 1 is shown by the timeline 610, the misaligned timing of CG 2 and data generated for QoS flow 2 is shown by the timeline 620 and the misaligned timing of CG 3 and data generated for QoS flow 3 is shown by the timeline 630. As will described in more detail below with regard to 510 of the method 500, in some embodiments, the UE 110 may provide an indication of the offsets 640-660 to the gNB 120A indicating that the timing of the CGs 1-3 should be adjusted to align with the timing of the QoS flows 1-3.

FIG. 6b shows an example mapping where multiple QoS flows are each mapped to a same LCH. Here, the application 605 running on the UE 110 is configured with three QoS flows 1-3 each mapped to a same LCH 1. In this example, the LCH 1 is mapped to a CG 1. In other configurations where multiple QoS flows are mapped to the same LCH, the LCH may be mapped to multiple different CGs. Although not shown in FIG. 6b, the data generated for one or more of the QoS flows may not align in time with the timing of CG 1.

Returning to the method 500 of FIG. 5, in 505, the UE 110 identifies that data generated for one or more QoS flows is not aligned in time with a corresponding CG. An example of this is shown by the timelines 610-630 of FIG. 6a.

In 510, the UE 110 transmits CG adjustment information to the gNB 120A. The CG adjustment information may be provided as a medium access control (MAC) control element (CE), an information element (IE) in a RRC message or in any other appropriate manner.

As will be described below, the CG adjustment information may indicate to the gNB 120A that an adjustment to the CG timing may be beneficial for the QoS flow. For instance, the adjustment to the timing may allow the UE 110 and the network to avoid requesting and configuring DGs on top of the CGs.

In some embodiments, the CG adjustment information may comprise an indication of a recommended CG allocation that is based on the timing of the data generated for the QoS flow. This recommended allocation may trigger a change of a start symbol if a current start symbol indicated by the "timeDomainAllocation" parameter needs alignment. Those skilled in the art will understand that the "timeDomainAllocation" parameter is part of an "rrc-ConfiguredUplinkGrant" message and indicates a combination of a start symbol, a length and PUSCH mapping type. Thus, the information provided by the UE 110 may replace the configured integer value of the "timeDomainAllocation" parameter.

In some embodiments, the CG adjustment information may comprise an indication of a recommended time domain offset that is based on the timing of the data generated for the QoS flow. This recommended time domain offset corresponding to a reference subframe number (SFN) may be indicated by the "timeDomainOffset" parameter. Those skilled in the art will understand that the "timeDomainOffset" parameter is part of the "rrc-ConfiguredUplinkGrant" message and indicates an offset related to the reference SFN which is indicated by the parameter "timeReferenceSFN" of the same RRC message. Thus, the information provided by the UE 110 may replace the configured integer value of the "timeDomainOffset" parameter.

The CG adjustment information may also be referred to as UE assistance information. The UE assistance information may correspond to a particular QoS flow and include information such as, but not limited to, a flow ID (e.g., QFI, etc.), periodicity, a minimum packet size, a maximum packet size and a timing offset value that is aligned with a CG.

In 515, the UE 110 transmits on the PUSCH using the adjusted CG timing. In some embodiments, the UE 110 may receive an explicit indication from the gNB 120A that the CG has been adjusted based on the information provided by the UE 110. In other embodiments, the UE 110 may implicitly determine that the network has made the adjustment to the CG based on the information provided by the UE 110.

In another aspect, the exemplary embodiments introduce a recommended bit rate parameter that accommodates XR traffic. Those skilled in the art will understand that XR is an umbrella term for different types of realities and may generally refer to real-and-virtual combined environments and associated human-machine interactions generated by computer technology and wearables. To provide some examples, the term XR may encompass augmented reality (AR), mixed reality (MR) and virtual reality (VR). However, any reference to XR being specific to a particular use case or type of traffic is merely provided for illustrative purposes.

Those skilled in the art will understand that a recommended bit rate parameter is a parameter signaled to the UE 110 by the gNB 120A that indicates a recommended bit rate in the uplink and/or downlink. Within the context of the signaling diagram 400, this parameter may be provided to the UE 110 prior to or during the allocation of CGs 425-428.

In one approach, a recommended bit rate parameter may be signaled to the UE 110 indicating a recommended bit rate for QoS flows of XR applications or any other type of application that generates periodic consistent data pattern. For XR services, it may be beneficial to increase the maximum possible bit rate value from the conventional 8000 kilobytes per second (kb/s). To provide an example, the maximum recommended bit rate that may be signaling by the recommended bit rate parameter may be 20 megabytes per second (Mb/s), 1 gigabyte per second (Gb/s), 2 Gbs, etc. However, reference to these values is provided as an example, the exemplary embodiments are not limited to any particular maximum bit rate value.

In another approach, the recommended bit rate concept may be applied at the QoS flow level. In one option, a MAC CE may be configured to indicate per QoS flow level. In some embodiments, a QFI may be used instead of a LCID. This allows the UE 110 to apply the recommended bit rate at the QoS level instead of the LCH level. In another embodiment, a combination of LCI and a QoS flow ID bitmap may be used in conjunction with a list of bit rates. This allows the UE 110 to apply the recommended bit rate at the QoS level when there are multiple QoS flows to manage.

In some embodiments, the MAC CE may include an index value that is mapped to a NR recommended bit rate value as specified in 3GPP TS 38.321 table 6.1.3.20-1. Currently, index values 57-63 are reserved. The exemplary embodiments introduce values for these reserved fields to accommodate XR traffic or any other appropriate type of traffic that is generated in a periodic and consistent manner. As indicated above, the current maximum value of 8000 kb/s may not be appropriate for XR services.

Figure 7:
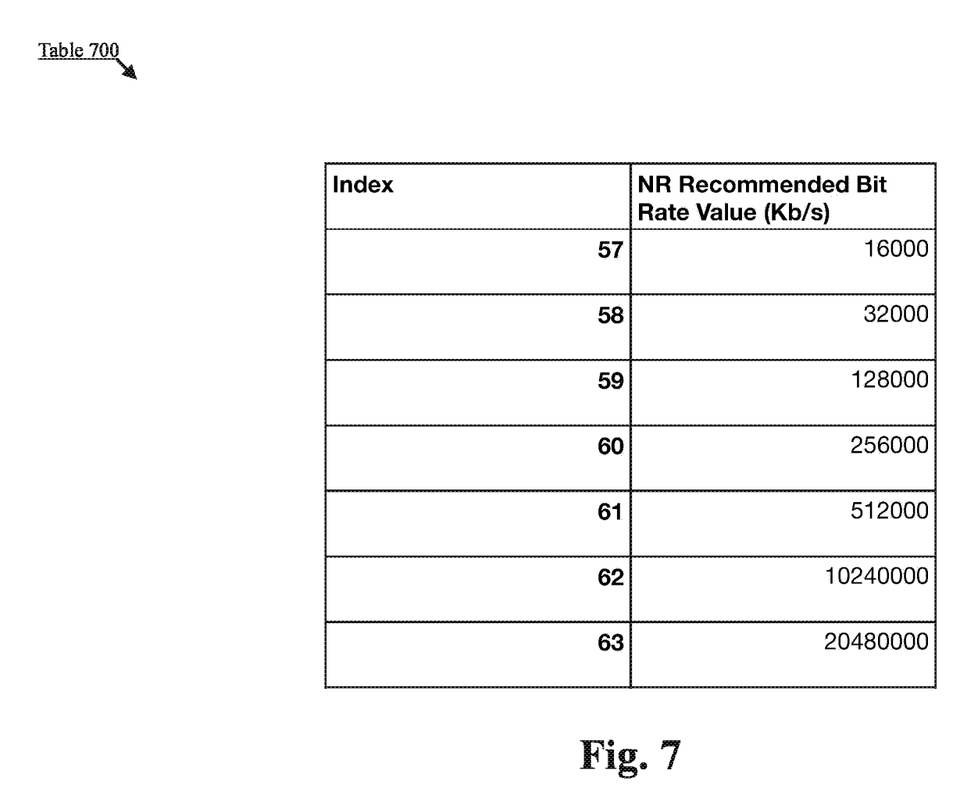
FIG. 7 shows a table including an index value and a corresponding recommended bit rate value according to various exemplary embodiments.

FIG. 7 shows a table 700 including an index value and a corresponding recommended bit rate value. In this example, these index values 57-63 are no longer reserved and have been updated to rates up to 2 Gb/s. In some embodiments, to exceed the recommended bit rates of the table, a multiplication factor may be implemented to go beyond 2 Gb/s.

In another option, a recommended bit rate may be indicated by a data adaptation protocol (SDAP) control PDU. For example, an end-marker control PDU may be configured to include a QFI and a bit rate.

EXAMPLES

In a first example, a user equipment (UE) comprises a transceiver configured to communicate with a network and a processor communicatively coupled to the transceiver and configured to perform operations comprising establishing a packet data unit (PDU) session with the network, wherein the PDU session comprises a quality of service (QOS) flow, receiving one or more radio resource control (RRC) messages indicating a configured grant (CG) allocated to the UE, wherein the QoS flow is mapped to a logical channel (LCH) and wherein the LCH is mapped to the CG and transmitting data on a physical uplink shared channel (PUSCH) using a time and a frequency resource of the CG.

In a second example, the UE of the first example, the operations further comprising identifying that data generated by an application running on the UE for the QoS flow is not aligned in time with the time resources of the CG and transmitting CG adjustment information to the network, wherein the CG adjustment information is configured to cause the network to adjust the time resources of the CG.

In a third example, the UE of the second example, wherein the CG adjustment information comprises a recommended allocation which triggers a change of a start symbol previously indicated to the UE via a time domain allocation parameter.

In a fourth example, the UE of the third example, wherein the recommended allocation is provided via a medium access control (MAC) control element (CE).

In a fifth example, the UE of the third example, wherein the recommended allocation is provided via an information element (IE) in a RRC message.

In a sixth example, the UE of the second example, wherein the CG adjustment information comprises a recommended time domain offset which corresponds to a reference subframe number (SFN) previously indicated to the UE by a time reference SFN parameter.

In a seventh example, the UE of the sixth example, wherein the recommended time domain offset is provided via a medium access control (MAC) control element (CE).

In an eighth example, the UE of the sixth example, wherein the recommended time domain offset is provided via an information element (IE) in a RRC message.

In a ninth example, the UE of the second example, wherein the CG adjustment information comprises at least one of an QoS flow ID (QFI), a periodicity, a minimum packet size, a maximum packet size and a timing offset value aligned with the CG.

In a tenth example, the UE of the first example, the operations further comprising receiving, from the network, a recommended bit rate that is to be applied to the QoS flow.

In an eleventh example, the UE of the tenth example, wherein the QoS flow is associated with an extended reality (XR) application.

In a twelfth example, the UE of the tenth example, wherein the recommended bit rate is greater than 8000 kilobytes per second (kb/s).

In a thirteenth example, the UE of the tenth example, wherein the recommended bit rate is provided in a medium access control (MAC) control element (CE) configured to indicate per QoS flow bit rate.

In a fourteenth example, the UE of the thirteenth example, wherein the MAC CE includes a QoS flow identifier (QFI) and does not include a logical channel ID (LCID).

In a fifteenth example, the UE of the thirteenth example, wherein the MAC CE includes a QoS flow ID bitmap.

In a sixteenth example, the UE of the tenth example, wherein the recommended bit rate is provided in service data application protocol (SDAP) control PDU.

In a seventeenth example, a base station comprises a transceiver configured to communicate with a user equipment (UE) and a processor communicatively coupled to the transceiver and configured to perform operations comprising establishing a connection with the UE, wherein the UE is configured with a packet data unit (PDU) session comprising a quality of service (QOS) flow, transmitting one or more radio resource control (RRC) messages indicating a configured grant (CG) allocated to the UE, wherein the QoS flow is mapped to a logical channel (LCH) and wherein the LCH is mapped to the CG and receiving data on a physical uplink shared channel (PUSCH) from the UE that was transmitted using a time and a frequency resource of the CG.

In an eighteenth example, the base station of the seventeenth example, the operations further comprising receiving CG adjustment information from the UE, wherein the CG adjustment information is configured to cause the base station to adjust the time resources of the CG.

In a nineteenth example, the base station of the eighteenth example, wherein the CG adjustment information comprises a recommended allocation which triggers a change of a start symbol previously indicated to the UE via a time domain allocation parameter.

In a twentieth example, the base station of the eighteenth example, wherein the CG adjustment information comprises a recommended time domain offset which corresponds to a reference subframe number (SFN) previously indicated to the UE by a time reference SFN parameter.

In a twenty first example, the base station of the eighteenth example, wherein the CG adjustment information comprises at least one of an QoS flow ID (QFI), a periodicity, a minimum packet size, a maximum packet size and a timing offset value aligned with the CG.

In a twenty second example, the base station of the seventeenth example, the operations further comprising transmitting a recommended bit rate that is to be applied to the QoS flow.

In a twenty third example, the base station of the twenty second example, wherein the QoS flow is associated with an extended reality (XR) application.

In a twenty fourth example, the base station of the twenty second example, wherein the recommended bit rate is greater than 8000 kilobytes per second (kb/s).

In a twenty fifth example, the base station of the twenty second example, wherein the recommended bit rate is provided in a medium access control (MAC) control element (CE) configured to indicate per QoS flow bit rate.

In a twenty sixth example, the base station of the twenty fifth example, wherein the MAC CE includes a QoS flow identifier (QFI) and does not include a logical channel ID (LCID).

In a twenty seventh example, the base station of the twenty fifth example, wherein the MAC CE includes a QoS flow ID bitmap.

In a twenty eighth example, the base station of the twenty fifth example, wherein the recommended bit rate is provided in service data application protocol (SDAP) control PDU.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    establishing a packet data unit (PDU) session with a network, wherein the PDU session comprises a quality of service (QOS) flow;
    receiving one or more radio resource control (RRC) messages indicating a configured grant (CG) allocated to the UE, wherein the QoS flow is mapped to a logical channel (LCH) and wherein the LCH is mapped to the CG;
    generating data to be transmitted on a physical uplink shared channel (PUSCH) using a time resource and a frequency resource of the CG; and
    generating, for transmission to the network, UE assistance information corresponding to the QoS flow, wherein the UE assistance information includes at least periodicity information.

2. The processor of claim 1, the operations further comprising:
    identifying that data generated by an application running on the UE for the QoS flow is not aligned in time with the time resource of the CG; and
    transmitting CG adjustment information to the network, wherein the CG adjustment information is configured to cause the network to adjust the time resources of the CG.

3. The processor of claim 2, wherein the CG adjustment information comprises a recommended allocation which triggers a change of a start symbol previously indicated to the UE via a time domain allocation parameter.

4. The processor of claim 3, wherein the recommended allocation is provided via a medium access control (MAC) control element (CE) or an information element (IE) in a RRC message.

5. The processor of claim 2, wherein the CG adjustment information comprises a recommended time domain offset which corresponds to a reference subframe number (SFN) previously indicated to the UE by a time reference SFN parameter.

6. The processor of claim 5, wherein the recommended time domain offset is provided via a medium access control (MAC) control element (CE) or an information element (IE) in a RRC message.

7. The processor of claim 2, wherein the CG adjustment information comprises at least one of an QoS flow ID (QFI), a periodicity, a minimum packet size, a maximum packet size and a timing offset value aligned with the CG.

8. The processor of claim 1, the operations further comprising:
    receiving, from the network, a recommended bit rate that is to be applied to the QoS flow.

9. The processor of claim 8, wherein the QoS flow is associated with an extended reality (XR) application.

10. The processor of claim 8, wherein the recommended bit rate is greater than 8000 kilobytes per second (kb/s).

11. The processor of claim 8, wherein the recommended bit rate is provided in a medium access control (MAC) control element (CE) configured to indicate per QoS flow bit rate.

12. The processor of claim 8, wherein the recommended bit rate is provided in service data application protocol (SDAP) control PDU.

13. A processor of a base station configured to perform operations comprising:
  establishing a connection with a user equipment (UE), wherein the UE is configured with a packet data unit (PDU) session comprising a quality of service (QOS) flow;
  transmitting one or more radio resource control (RRC) messages indicating a configured grant (CG) allocated to the UE, wherein the QoS flow is mapped to a logical channel (LCH) and wherein the LCH is mapped to the CG;
  receiving data on a physical uplink shared channel (PUSCH) from the UE that was transmitted using a time resource and a frequency resource of the CG; and
  receiving UE assistance information corresponding to the QoS flow, wherein the UE assistance information includes at least periodicity information.

14. The processor of claim 13, the operations further comprising:
  receiving CG adjustment information from the UE, wherein the CG adjustment information is configured to cause the base station to adjust the time resource of the CG.

15. The processor of claim 14, wherein the CG adjustment information comprises a recommended allocation which triggers a change of a start symbol previously indicated to the UE via a time domain allocation parameter.

16. The processor of claim 14, wherein the CG adjustment information comprises a recommended time domain offset which corresponds to a reference subframe number (SFN) previously indicated to the UE by a time reference SFN parameter.

17. The processor of claim 14, wherein the CG adjustment information comprises at least one of an QoS flow ID (QFI), a periodicity, a minimum packet size, a maximum packet size and a timing offset value aligned with the CG.

18. The processor of claim 13, the operations further comprising:
  transmitting a recommended bit rate that is to be applied to the QoS flow.

19. The processor of claim 18, wherein the QoS flow is associated with an eXtended reality (XR) application.

20. The processor of claim 18, wherein the recommended bit rate is provided in a medium access control (MAC) control element (CE) configured to indicate per QoS flow bit rate.

* * * * *